(12) United States Patent
Allen et al.

(10) Patent No.: US 9,286,290 B2
(45) Date of Patent: Mar. 15, 2016

(54) PRODUCING INSIGHT INFORMATION FROM TABLES USING NATURAL LANGUAGE PROCESSING

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/262,288

(22) Filed: Apr. 25, 2014

(65) Prior Publication Data

US 2015/0309990 A1    Oct. 29, 2015

(51) Int. Cl.
*G06F 17/27* (2006.01)

(52) U.S. Cl.
CPC ........ *G06F 17/2785* (2013.01); *G06F 17/2705* (2013.01)

(58) Field of Classification Search
CPC .................................................. G06F 17/2785
See application file for complete search history.

(56) References Cited

U.S. PATENT DOCUMENTS

| | | | |
|---|---|---|---|
| 4,688,195 A | 8/1987 | Thompson et al. | |
| 5,950,196 A * | 9/1999 | Pyreddy ............ | G06F 17/30911 707/769 |
| 6,161,103 A | 12/2000 | Rauer et al. | |
| 6,904,428 B2 | 6/2005 | Frieder et al. | |
| 7,412,510 B2 | 8/2008 | Schweitzer et al. | |
| 7,620,665 B1 | 11/2009 | George et al. | |
| 7,631,065 B2 | 12/2009 | Schweitzer et al. | |
| 7,788,580 B1 | 8/2010 | Goodwin et al. | |
| 7,792,823 B2 | 9/2010 | Cain et al. | |
| 7,792,829 B2 | 9/2010 | Brill et al. | |
| 8,010,564 B2 | 8/2011 | Minagawa et al. | |
| 8,037,108 B1 | 10/2011 | Chang | |
| 8,055,661 B2 | 11/2011 | Lee et al. | |
| 8,091,020 B2 | 1/2012 | Kuppusamy et al. | |
| 8,255,789 B2 | 8/2012 | Berger et al. | |
| 8,364,673 B2 | 1/2013 | Chang et al. | |

(Continued)

FOREIGN PATENT DOCUMENTS

| | | |
|---|---|---|
| JP | 05334490 | 12/1993 |
| WO | WO 03/012661 A1 | 3/2003 |

OTHER PUBLICATIONS

"About SemanticTable", SernanticTable.org, Bioinformatics and Systems Engineering (BASE) division, RIKEN, http://semantictable.org, accessed on Oct. 25, 2012, 1 page.

(Continued)

*Primary Examiner* — King Poon
*Assistant Examiner* — Ibrahim Siddo
(74) *Attorney, Agent, or Firm* — Stephen J. Walder, Jr.; Reza Sarbakhsh

(57) ABSTRACT

Mechanisms for generating insight statements from table data are provided. A portion of content comprising a table data structure and text associated with the table data structure is received and at least one of key terms or semantic relationships in the table data structure and the associated text are identified. Fields of an insight statement template are populated with information obtained from the key terms and semantic relationships to generate an insight statement data structure. The insight statement data structure is then output. The insight statement data structure is a natural language statement describing an aspect of the table data structure.

18 Claims, 7 Drawing Sheets

(56) References Cited

U.S. PATENT DOCUMENTS

| | | | |
|---|---|---|---|
| 8,442,988 B2 | 5/2013 | Draese et al. | |
| 2002/0078406 A1 | 6/2002 | Kondoh et al. | |
| 2003/0097384 A1 | 5/2003 | Hu et al. | |
| 2004/0030687 A1 | 2/2004 | Hidaka et al. | |
| 2004/0064447 A1 | 4/2004 | Simske et al. | |
| 2004/0117739 A1 | 6/2004 | Challenger et al. | |
| 2006/0173834 A1* | 8/2006 | Brill | G06F 17/30554 |
| 2007/0011183 A1 | 1/2007 | Langseth et al. | |
| 2007/0094006 A1 | 4/2007 | Todhunter et al. | |
| 2009/0171999 A1 | 7/2009 | McColl et al. | |
| 2009/0287678 A1 | 11/2009 | Brown et al. | |
| 2010/0281455 A1 | 11/2010 | Anand et al. | |
| 2011/0066587 A1 | 3/2011 | Ferrucci et al. | |
| 2011/0125734 A1 | 5/2011 | Duboue et al. | |
| 2011/0126275 A1 | 5/2011 | Anderson et al. | |
| 2011/0320189 A1 | 12/2011 | Carus et al. | |
| 2012/0004905 A1 | 1/2012 | Bobick et al. | |
| 2012/0011115 A1 | 1/2012 | Madhavan et al. | |
| 2012/0303661 A1 | 11/2012 | Blohm et al. | |
| 2013/0007055 A1 | 1/2013 | Brown et al. | |
| 2013/0018652 A1 | 1/2013 | Ferrucci et al. | |
| 2013/0060774 A1 | 3/2013 | Shepherd et al. | |
| 2013/0066886 A1 | 3/2013 | Bagchi et al. | |
| 2013/0151538 A1* | 6/2013 | Dmitriev et al. | 707/750 |
| 2013/0185307 A1 | 7/2013 | El-Yaniv et al. | |

OTHER PUBLICATIONS

"Gleaning Resource Descriptions from Dialects of Languages (GRDDL), WC3 Recommendation", W3C, http://www.w3.org/TR/grddl/, Sep. 11, 2007, 17 pages.

"List of IBM Patents or Patent Applications Treated as Related (Appendix P), 2 pages".

"SPARQLMotion Getting Started Guide", TopOuadrant, Inc., http://www.topquadrant.com/products/SPARQLMotion_docs/SPARQLMotion_guide.html, accessed on Oct. 25, 2012, 6 pages.

Golbeck, Jennifer et al., "New Tools for the Semantic Web", Knowledge Engineering and Knowledge Management: Ontologies and the Semantic Web, Lecture Notes in Computer Science, DOI: 10.1007/3-540-45810-7_35, vol. 2473/2002, 2002, 11 pages.

High, Rob, "The Era of Cognitive Systems: An Inside Look at IBM Watson and How it Works", IBM Corporation, Redbooks, Dec. 12, 2012, 16 pages.

IBM, "Dynamic Model-Extracting Table Widget", ip.com, IPCOM000010243D, Nov. 11, 2002, 7 pages.

Langegger, Andreas et al., "XLWrap—Querying and Integrating Arbitrary Spreadsheets Spreadsheets with SPARQL", Proceedings of the 8th International Semantic Web Conference, 2009, Springer-Verlag Berlin, Heidelberg, ISBN: 978-3-642-04929-3, 2009, 16 pages.

Pinto, David et al., "Table Extraction Using Conditional Random Fields", ACM, 2003, SIGIR '03, Jul. 28-Aug. 1, 2003, 8 pages.

Piris, Ruben N., "Extracting Knowledge Bases from table-structured Web Resources applied to the semantic based Requirements Engineering Methodology SoftWiki", Informatik Sep. 27, 2010-Oct. 1, 2010, Leipzig, vol. 2 of Lecture Notes in Informatics (LNI), pp. 992-995.

Pivk, Aleksander et al., "From Tables to Frames", http://people.aifb.kit.edu/pci/FromTablesToFramesTech.pdf, Jul. 19, 2004, 1-17.

Tao, Cui et al., "Automatic Hidden-Web Table Interpretation, Conceptualization, and Semantic Annotation", Department of Computer Science, Brigham Young University, Provo, UT 84602, USA, 2009, pp. 1-21.

Yuan, Michael J., "Watson and healthcare, How natural language processing and semantic search could revolutionize clinical decision support", IBM developerWorks, IBM Corporation, Apr. 12, 2011, 14 pages.

* cited by examiner

THE SHARES UNDER OPTION [2][4A] AT DECEMBER 31, 2011 WERE IN THE FOLLOWING EXERCISE PRICE RANGES [2][4A][4C]:

| EXERCISE PRICE RANGE [3][4C] | WEIGHTED AVERAGE [5A] EXERCISE PRICE [3][4A][5B] | NUMBER [5A] OF SHARES UNDER OPTION [3][4A] | AGGREGATE [5A] INTRINSIC VALUE [5B] | WEIGHTED AVERAGE [5A] REMAINING CONTRACTUAL LIFE (IN YEARS)[5B] |
|---|---|---|---|---|
| $61-85 | $78 | 8,079,175 [6C] | $857,827,574 [6C] | 1.3 [6A] |
| $86-105 | $97 | 11,061,890 [6B][6C] | $957,308,722 [6B] | 2.6 [6A][6B] |
| $106 AND OVER | $106 | 1,521,257 [6A] | $118,474,466 [6A] | 2.0 |
| OPTIONS OUTSTANDING AND EXERCISABLE | $90 | 20,662,322 [6C] | $1,933,610,763 [6C] | 2.1 |

*FIG. 6*

PRODUCING INSIGHT INFORMATION FROM TABLES USING NATURAL LANGUAGE PROCESSING

BACKGROUND

The present application relates generally to an improved data processing apparatus and method and more specifically to mechanisms for producing insight information from tables using natural language processing.

Documents include information in many forms. For example, textual information arranged as sentences and paragraphs convey information in a narrative form. However, some types of information are presented in a tabular organization. For example, a document can include tables for presenting financial information, organizational information, and more generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form. NLP mechanisms typically have difficulty in handling tables within textual content.

SUMMARY

In one illustrative embodiment, a method, in a data processing system, is provided for generating insight statements from table data. The method comprises receiving, by the data processing system, a portion of content comprising a table data structure and text associated with the table data structure and identifying, by the data processing system, at least one of key terms or semantic relationships in the table data structure and the associated text. The method further comprises populating, by the data processing system, fields of an insight statement template with information obtained from the key terms and semantic relationships to generate an insight statement data structure. Moreover, the method comprises outputting, by the data processing system, the insight statement data structure. The insight statement data structure is a natural language statement describing an aspect of the table data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 provides another example illustrating the operation of the illustrative embodiments with regard to identifying insight data points in an example table data structure.

DETAILED DESCRIPTION

Figure 1:
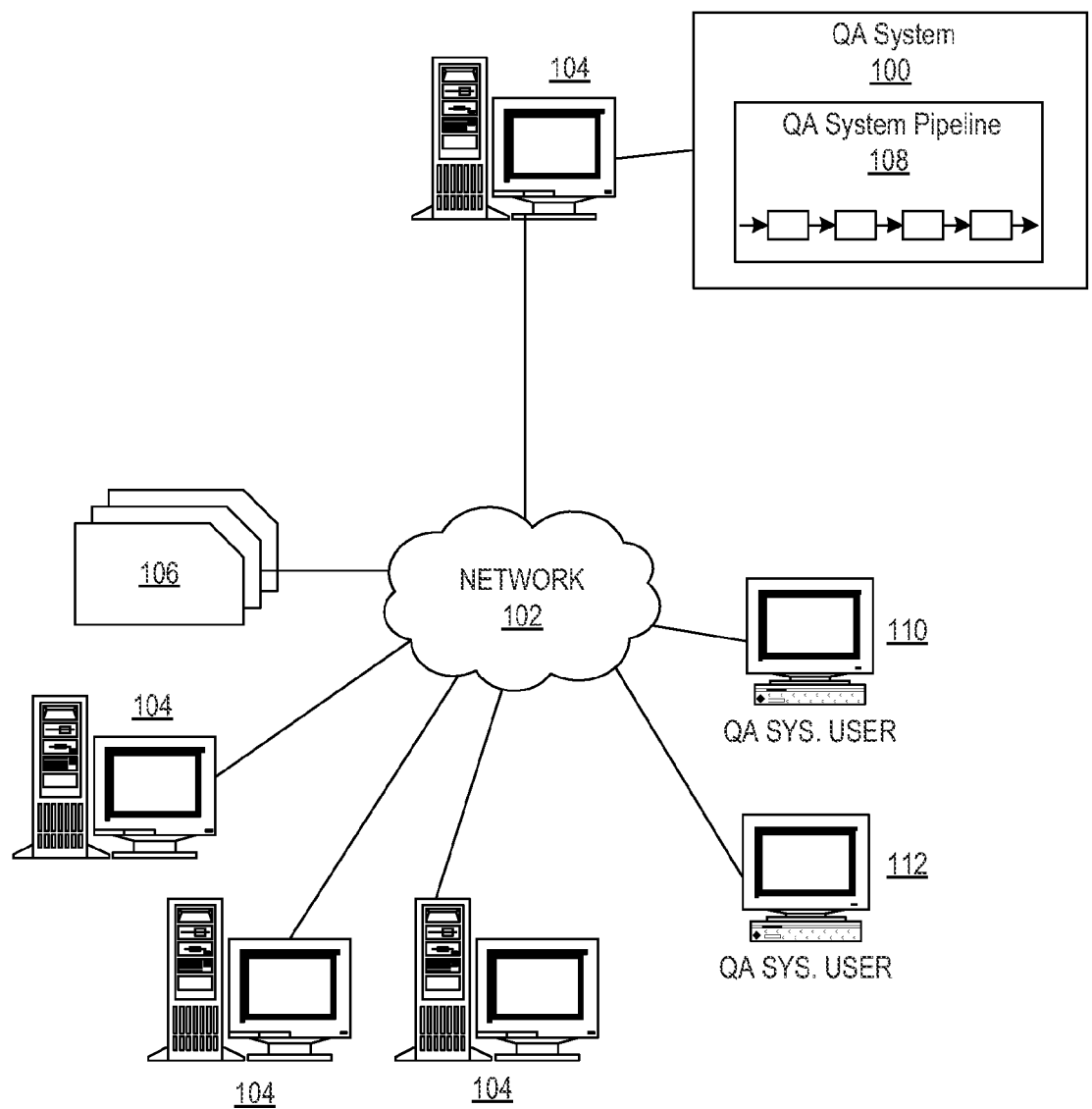
FIG. 1 depicts a schematic diagram of one illustrative embodiment of a question/answer creation (QA) system in a computer network.

The illustrative embodiments provide mechanisms for producing insight information from natural language processing of table data structures in a corpus of content. The illustrative embodiments may be utilized, for example, with a Question and Answer (QA) system, such as the IBM Watson™ QA system available from International Business Machines Corporation. With the mechanisms of the illustrative embodiments, table data structure content may be converted to natural language processing statements which may then be further processed by a QA system or other natural language processing (NLP) system and used as content, such as additional portions of a corpus.

It should be appreciated that the table data structures may be provided in various formats including table data structures being provided as separate table data files or as portions of content embedded in other data structures, such as documents of a corpus of information, for example. For purposes of the following description, it will be assumed that the mechanisms of the illustrative embodiments will be applied to table data structures embedded or otherwise associated with a document in a corpus of information for the purpose of performing natural language processing on the table data structure. However, it should be appreciated that this is only one possible implementation and the mechanisms of the illustrative embodiments are not limited to such. Rather, the scope of the illustrative embodiments of the present invention is intended to encompass any table data structure and any processing operation that may be applied to a table data structure including, but not limited to, table data structures embedded in documents and NLP operations being applied to table data structures.

Using NLP as an example processing operation to be applied to a table data structure, the illustrative embodiments recognize that documents subjected to NLP commonly include tabular data, i.e. content in the form of one or more tabular data structures (tables). A cell of a table is a containing unit within a table, such that the contents of the cell can be uniquely identified by a row and column or other suitable coordinates of the table.

Usually when there is a table in a document, there is a short textual summary of the table before or after the table. The short summary usually describes in general the information contained in the table and what the table's potential use may be. Sometimes more insight is assumed to be able to be gleaned from the table by the reader, but that specific insight is not specified in the summary of the table. A human reader would typically glance at the table and quickly perform a mental calculation or evaluation of the table to generate some insight, e.g., generating a sum, total, determining the minimum value in a column, determining the maximum value in a column, etc. However, natural language processing (NLP) systems and QA systems are not configured to extract such insight in an automated manner.

The illustrative embodiments provide mechanisms for identifying summary information related to tabular data in a document. Natural language processing is performed across both the summary and tabular data to develop and define insightful statements about the tabular data. These insightful statements may include, for example, totals, ratios, summaries, minimums, maximums, variances, and the like based on data types, data categories and the like. For example, a statement may be of the type "The most tickets bought by a customer was 15" or "The values of unit sales followed a normal distribution curve." Thus, the mechanisms of the illustrative embodiments utilize NLP mechanisms to automatically understand data in a tabular format without having to have a prior knowledge about the table, i.e. no metadata or special formatting/encoding is necessary. The result is a set of NLP statements that may be used as a further source of input content to a QA system or NLP system for further processing, such as generating candidate answers to input questions in a QA system, for example.

In one illustrative embodiment, a corpora is ingested that comprises a document having one or more tables of data. For ease of explanation, it will be assumed that a single table data structure is identified in the corpora although it should be appreciated that the illustrative embodiments may be employed on multiple table data structures found through the ingestion of one or a plurality of documents in the corpora. The terms, semantic relationships, and the like, are identified in the corpora and emphasis is provided on terms and semantic relationships found in summary portions of the corpora or content in close proximity to, e.g., within a predetermined number of sentences, words, etc. of, the table data structure. The column/row headers of the table data structure are read and keywords are parsed out. Terms in the summary or close proximity text and semantic relationships are matched to the keywords extracted from the headers. Such matching may be of the type of a direct match of words, matching using a dictionary of terms, data structures specifying similar terms, e.g. synonyms, or any other type of matching that may be performed using natural language processing techniques.

Column/row types for the column/row headers may be determined using various methods including identifying synonyms, noun triggers from dictionaries, or the like. Insightful data points may be determined using various methods including, but not limited to, using cell scan methodologies to determine minimum/maximum values, scanning cells for values with high variance to the rest of the row/column, scanning cells for similar values, scanning between rows/columns to determine rows/columns having similarity relationships or dependencies, scanning cells for high/low variance, equivalence, similarity, totals, or other computational relationships.

The mechanisms of the illustrative embodiments identify the column and/or rows that correspond to the insightful data by verifying the insights map to semantic relationships and identifying the appropriate insight statement templates that correspond to the insight and semantic relationship. The insight statements are then generated using the columns and rows and/or the values and semantic relationship information.

As mentioned above, in some illustrative embodiments, the mechanisms of the illustrative embodiments are utilized to ingest a corpora for natural language processing by an NLP system or question answering by a QA system. For purposes of the following description, it will be assumed that the table ingestion mechanisms of the illustrative embodiments are utilized with a QA system, such as the IBM Watson™ QA system available from International Business Machines Corporation of Armonk, N.Y. While a QA system will be assumed for purposes of the present description, this is not intended to be limiting on the various implementations or embodiments of the mechanisms of the illustrative embodiments. To the contrary, the mechanisms of the illustrative embodiments may be utilized with any system requiring, or being able to benefit from, the extraction of insightful statements from table data structures in documents as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
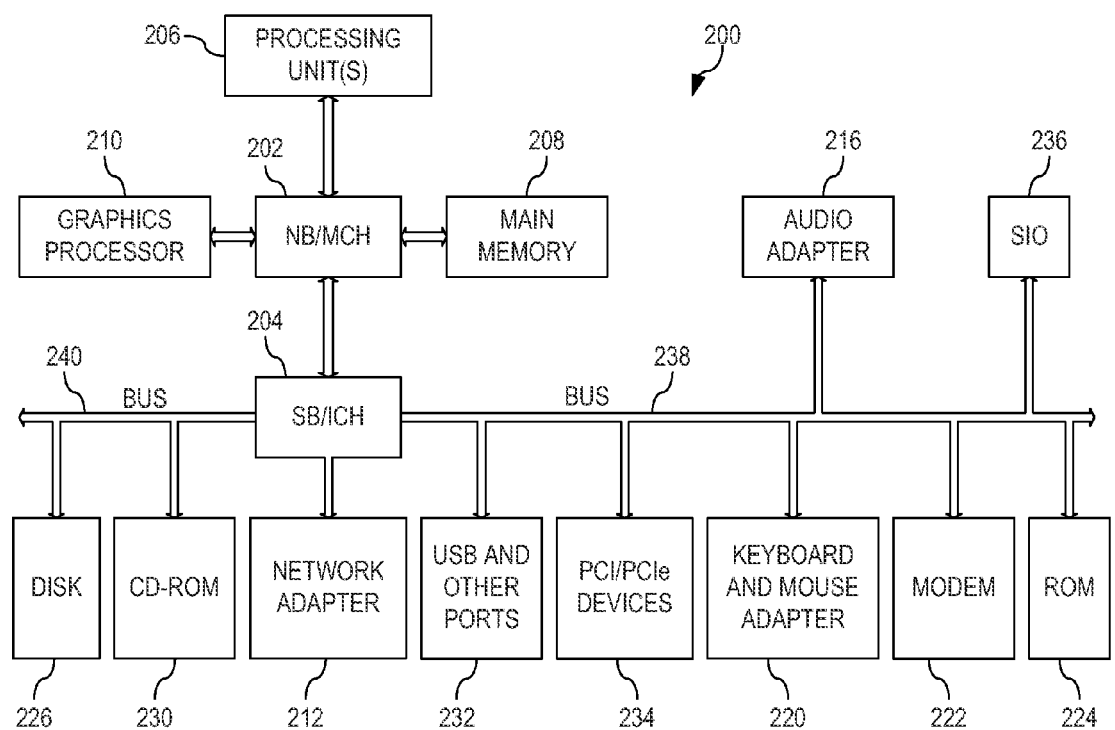
FIG. 2 is a block diagram of an example data processing system in which aspects of the illustrative embodiments may be implemented.
Figure 3:
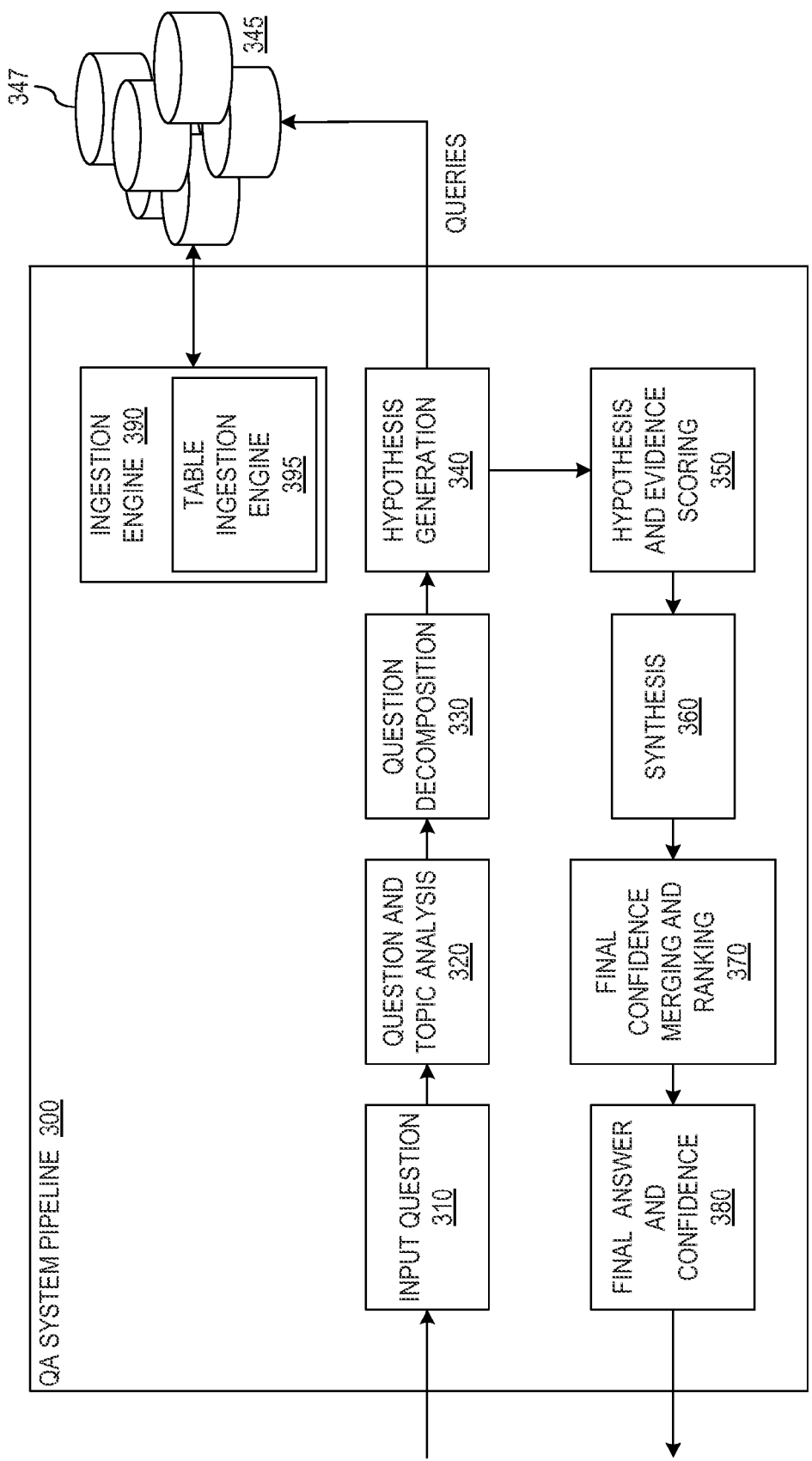
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend, the functionality of these QA mechanisms with regard to ingesting sources of content comprising table data structures, e.g., electronic documents of a corpora or corpus that comprise tables.

Since the mechanisms of the illustrative embodiments have significant applicability to QA systems and the illustrative embodiments may be utilized with QA systems, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments provide a mechanism for assisting in the answering of such questions by the QA system by providing a mechanism for extracting insightful statements from tabular data included in the corpora and providing such insightful statements as input to the QA system for processing to generate candidate answers.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. In accordance with mechanisms of the illustrative embodiments, some of these reasoning algorithms may be implemented to perform table analysis to identify elements of a table in a portion of content, e.g., keywords, column names, row names, etc. while other reasoning algorithms may identify semantic relationships and dependencies between portions of a table data structure and/or portions of a table data structure and summary text or text in close proximity to the table data structure within the portion of content. This will be described in greater detail hereafter.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems.

The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments. For purposes of the present description, it will be assumed that the improved mechanisms of the illustrative embodiments will be implemented in the QA system pipeline 300 itself as table ingestion engine logic 395 of an ingestion engine 390 for ingesting a corpus 347 or corpora 345, as described hereafter.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 500, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As described above, the queries generated by the hypothesis generation stage 340 are applied to a corpus 347 or the corpora 345. The corpus 347 or corpora 345 may represent raw data obtained from various sources which is pre-processed, or "ingested," by an ingestion engine 390 to permit the use of the data with hypothesis generation 340. That is the content of the corpus 347 and corpora 345 may be obtained from various sources that utilized different formats and methods for conveying information. The ingestion engine 390 may receive this content from these various sources and process the content using various annotators, reasoning algorithms, and the like, to generate annotated or processed corpus 347 or corpora 345 data that may be loaded into memory and operated on by the hypothesis generation 340 stage logic to apply the queries and generate candidate answers for answering an input question.

In accordance with the illustrative embodiments, the ingestion engine 390 comprises a table ingestion engine 395 that comprises logic for processing table data structures in content from the corpus 347 or corpora 345. As part of the ingestion operation performed by the ingestion engine 390, the ingestion engine 390 identifies table data structures in ingested content, e.g., via metadata, tags, analysis of document formatting or structural elements, or any other mechanism for identifying tables data structures within a portion of text, and invokes the operation of the table ingestion engine 395 on these table data structures to generate insightful statements from the table data structure which may then be stored as annotations, metadata, or a separate but linked data structure to the source of the content, e.g., a file associated with an ingested document, that may be used by the hypothesis generation 340 stage logic of the QA system pipeline 300 when applying queries and generating hypothesis (candidate answers) for the input question.

The table ingestion engine 395 has a plurality of analysis logic elements for identifying information in the table data structure, summary table, and/or text in close proximity to the table data structure. For example, the table ingestion engine 395 comprises logic that identifies keywords, row names, column names, and other features of the table data structure (hereafter referred to simply as the "table"). The table ingestion engine 395 further comprises logic that identifies semantic relationships within the table data structure, such as between rows, columns, or combinations of rows and columns. Furthermore, the table ingestion engine 395 comprises logic for identifying synonyms, matching words, matching context, and the like, between the rows, columns, combination of rows and columns, and between the content of the table and table summaries or close proximity text.

Of particular importance to the illustrative embodiments, the table ingestion engine 395 further comprises logic that generates table insight data structures based on pre-determined insight extraction rules, and insight statement generator logic that generate insight statements from results of the other analysis logic and the use of table insight templates. The table insight data structure generation logic uses rules to generate data structures specifying different types of insight able to be extracted from the table which may not necessarily be explicitly stated in the table. For example, a table may not specify the maximum value for a particular column of the table, yet the insight data structure generation logic, by applying its insight generation rules to the table, may identify the maximum value within the column, the location of the maximum value (e.g., column/row location of the cell containing the maximum value) and the row name/column name to which the maximum value corresponds. This information may be stored as insight data structure entries, such as a tuple, for use in generating insight statements as described hereafter.

The insight data structures may be input to the insight statement generator which generates insight statements using pre-determined insight statement templates. The insight statements are generated by the insight statement generator using not only the insight data structures, but also the various results generated from the other logic of the table ingestion engine 395 including the keywords, row names, column names, semantic relationships, synonyms, word matches, context matches, and the like. The insight statements generated by the insight statement generator of the table ingestion engine 395 are output as data structures which may be associated with the table in the portion of content either as annotations to the table, other metadata of the content, or as a separate file or data structure that is linked with or otherwise associated with the content in which the table is present.

As mentioned above, the table ingestion engine 395 may operate not only on the content of the table itself, but may also operate on the text in close proximity to the table. For example, if a summary of the table is provided either before or after the table, this summary may be analyzed by the table ingestion engine 395 to provide synonyms, matching words, semantic relationship information, or the like that may be used to provide additional weightings or emphasis to information extracted from the content of the table. If a summary is not provided, then the table ingestion engine 395 may be configured to look at a predetermined range of text before for after the table in the portion of content and may use that range of text as an effective summary of the table. For example, the table ingestion engine 395 may be configured to analyze up to a predetermined number of sentences, predetermined number of words, predetermined number of paragraphs, or the like, before or after the table.

For example, assuming that the ingestion engine 390 has received a document from a corpora 347 that contains a table data structure, the table data structure may be parsed by the table ingestion engine 395 to identify keywords, column and row headers or names, and the like. Furthermore, the summary, or a predetermined amount of text surrounding the table, may be analyzed to identify keywords as well as terms and semantic relationship that are specific to the particular corpora 347. For example, if the corpora 347 is associated with a medical domain, medical terms and semantic relationships for the medical domain may be identified within the summary text, e.g., melanoma is a type of cancer so that if the summary of the table includes the keyword "melanoma" then the semantic relationship of melanoma to cancer may be identified in the summary of the table. Similarly, in an automotive domain, a semantic relationship exists between a brake system and a brake pad in that the brake pad is a sub-component of the brake system such that if the term "brake pads" is present in a summary of a table, then the corresponding semantic relationship may be identified as being potentially applicable to the table. The semantic relationships that may be identified may be simple or complex and there may be many semantic relationships identified for keywords and terms in the summary or predetermined amount of surrounding text. Similarly, the identification of semantic relationships for portions of the table may be performed as well, e.g., semantic relationships for keywords and column/row names found in the table may be identified.

The semantic relationships may be identified based on the keywords and terms identified in the table and the table summary or predetermined amount of surrounding text (hereafter it will be assumed that the table has a summary for ease of explanation, but the present invention is not limited to use with tables having summaries as already discussed above). The semantic relationships for a particular domain may be stored as a knowledge base associated with the corpora 347 for that domain, or may be determined dynamically using a semantic relationship identification engine, such as described in commonly assigned and co-pending U.S. patent application Ser. No. 13/932,435. Other mechanisms that may be used to assist in identifying semantic relationships are described in commonly assigned and co-pending U.S. patent application Ser. Nos. 13/778,901 and 13/945,259. The semantic relationship knowledge base or results of semantic relationship identification are made accessible to the table ingestion engine 395.

The keywords or terms and semantic relationships found in the summary of the table are given a higher weighting or emphasis than other keywords or terms and semantic relationships identified in the table. Terms and semantic relationships in the summary of the table are matched to the keywords and column/row headers or names identified in the table. This matching may be done using direct matching of terms or keywords, using dictionaries of known terms, or detecting similarities between terms/keywords, e.g., different tenses of terms are matched, synonyms are matched, semantic relation types are matched, noun triggers from dictionaries may be matched, and the like. Moreover, insight from machine learning can be used to identify relationships between keywords and terms.

For example, if the table summary has the term "participation by country" and a column header of the table is "participants", then the matching logic of the illustrative embodiments will match these terms based on "participants" and "participation" having a synonym relationship. As another example, if a table summary has the term "compensation for executives" and column headers of "salary" and "stock options", these terms may be determined to match because they are all related to compensation, i.e. "compensation" in the summary is related to "salary" and "stock options". As yet another example, if a column header is "revenue", this term may be matched to a "currency" type via a noun trigger. If row headers are "East" and "West", these headers may be matched to a "location" type via noun triggers. Still further, machine learning may be used to determine that table summaries that included the keyword "compensation" had a high number of "currency" columns in the corresponding table and thus, if the present summary has the term "compensation" then it is highly likely that the table columns comprise a column of a "currency" type.

Based on the matching between the table summary and the keywords and semantic relationships identified in the table, insightful data points in the matching portions of the table are identified. That is, the identified portion of the table may be scanned to identify elements within the portion of the table that match predetermined insightful data points. For example, the table ingestion engine 395 may comprise logic that identifies insightful data points extracted from the actual data of the table, such as insightful data points corresponding to min/max values of a particular column, row, or combination of column/row, high/low variance, equivalence (having a same value), similar elements, total values, computational values such as differences, differences meeting certain predetermined thresholds, or a plethora of other types of insightful data points.

The identification of the insightful data point is combined with the identification of the particular column(s)/row(s) associated with the insightful data point, and the location of the insightful data point in the table, to thereby generate an insight data structure tuple. In one illustrative embodiment, this tuple may be of the type (entity, insight, table location, value), where "entity" refers to the matching entity between the table summary and the portion of the table, the "insight" is the type of insight data point (e.g., maximum, minimum, total, etc.), the "location" is the portion of the table from which the value for the insight is obtained, and "value" is the value corresponding to the insight.

For example, if a table summary includes the statement of "Sales by region and channel", the term "region" may be identified as having a semantic relationship with "location" as will the term "south" in a row header of the table. As a result, the "south" row is determined to match the summary and corresponding insightful data points may be identified in association with the "south" row. For example, a maximum value in the table for the "south" row may be identified even though the table itself does not specify the value to be the maximum. As a result, an insight tuple may be generated of the type (south, max, 3, b, 400), where "south" is the matching entity, "max" is the type of insight, i.e. a maximum value within the "south" row, "3, b" refers to the row and column location within the table where the maximum value is present, and "400" is the maximum value.

The insight data structures are then used to identify the column and rows of the table to which they correspond, such as by using the semantic relationships between elements of the table, and are mapped to insight statement templates using the columns/rows, semantic relationships, and the insight data structures. That is, the insight statement templates corresponding to the insights of the insight data structures are identified and the terms in columns/rows and semantic relationships are substituted into the template's fields for the various particular parts of speech. Moreover, the insight value is inserted into an appropriate field of the template.

For example, assume that the insight statement template for a "most" insight is of the type "The most <noun1><relationship><noun2>. The number of <noun1><relationship><noun2> were <value>." Populating this template may result in an insight statement of the type "The most participants attended from Canada. The number of participants attended from Canada were 84." In this example, "participants" is <noun1>, <relationship> is "attended from", <noun2> is "Canada", and <value> is "84."

A plurality of these insight statements may be generated for portions of the table and compiled into one or more data structures associated with the content in which the table is provided, e.g., the document in which the table is inserted. These insight statements may be generated using a plurality of pre-defined insight statement templates. Examples of these types of insight statement templates for particular types of insight, in addition to the one noted above, include, but are not limited to, the following:

"Max": "The maximum <term> are <value>"

"Variance": "The variance for <term> was <high|low>. The standard deviation for <term> was <value>."

"Distribution": "The values for <term> followed a <type> distribution curve."

"Equivalence": "<noun>(,<noun>)* had equivalent values for <term>. The value was <value>."

"Difference": "<noun> and <noun> had highly different values for <term>. <noun> was <value>, <noun> was <value>, and the difference between <noun> and <noun> was <value>."

"Total": "The values for <term> totaled <value>."

These insight statements may be added to the document itself as insight statement metadata, appended to the end of the document, stored as annotations to the document or the table within the document, stored as a separate file or data structure to which the document is linked, or the like. The insight statements may be provided along with the document as input to the QA system pipeline 300 as part of the corpus 347 or corpora 345 that is ingested by the QA system pipeline 300 and used as a basis for applying queries and generating hypothesis or candidate answers. Alternatively, the insight statements may be output for storage and later use.

It should be appreciated that while the above illustrative embodiment is described in terms of the table ingestion engine 395 and ingestion engine 390 being integrated into a QA system pipeline 300, the illustrative embodiments are not limited to such. Rather, the ingestion engine 390 and/or table ingestion engine 395 may be provided external to the QA system pipeline 300 as a separate logic element that performs pre-processing or ingestion of the corpus 347 or corpora 345. Alternatively, the table ingestion engine 395 may not be associated with a QA system pipeline 300 at all and may instead be an external or internal mechanism of a NLP system that processes documents or other textual content in which tables may be present.

Figure 4:
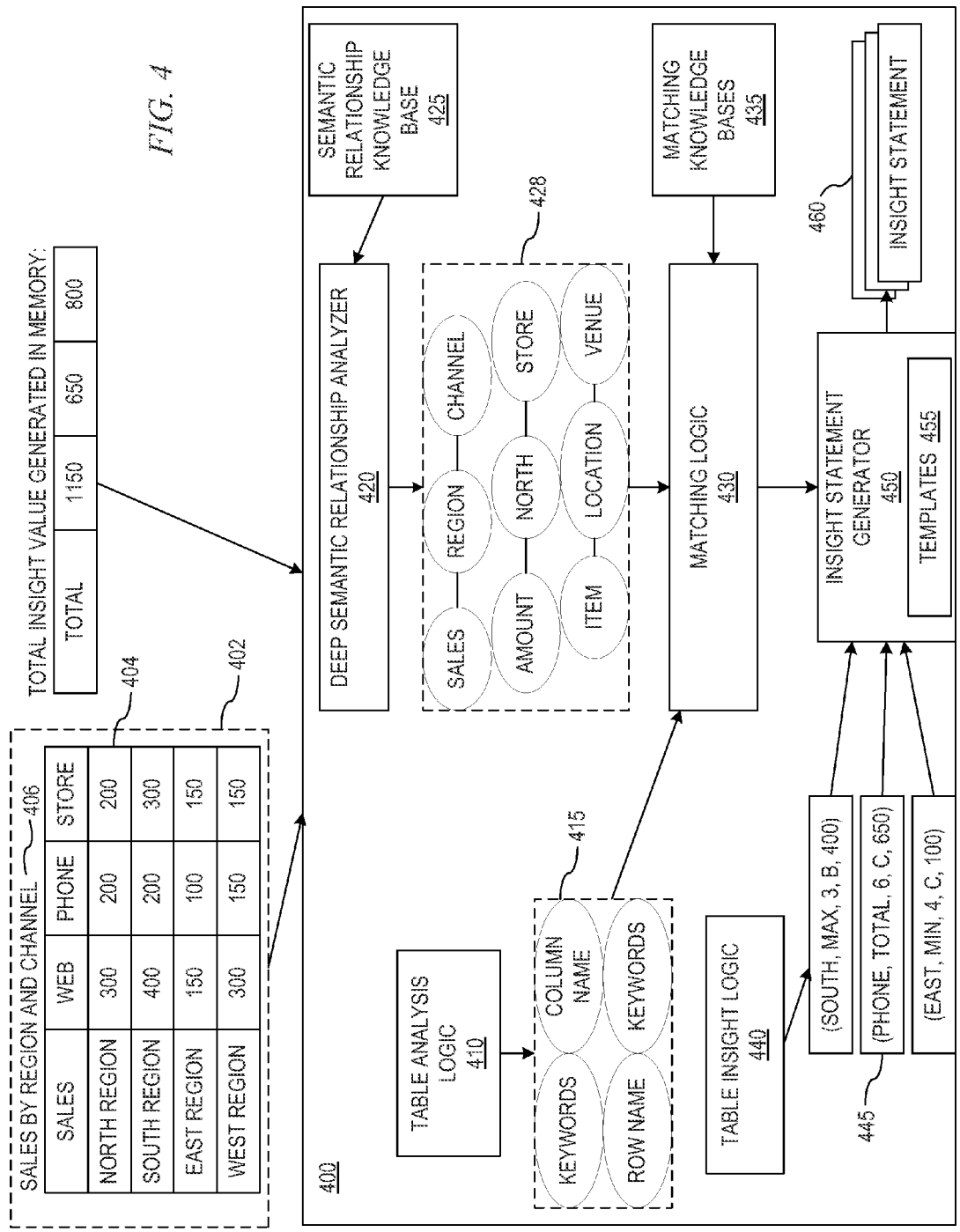
FIG. 4 is provided as an example block diagram illustrating the primary operational logic of a table ingestion engine and its operation in accordance with one illustrative embodiment.

To further illustrate the operation of the mechanisms of a table ingestion engine 395 in accordance with the illustrative embodiments, FIG. 4 is provided as an example block diagram illustrating the primary operational logic of a table ingestion engine and its operation in accordance with one illustrative embodiment. As shown in FIG. 4, the table ingestion engine comprises table analysis logic 410, deep semantic relationship analyzer 420, matching logic 430 with matching knowledge bases 435, table insight logic 440, and insight statement generator 450. It should be appreciated that the various logic elements 410-450 may be implemented in hardware, software executing on one or more processors, or any combination of hardware and software executing on one or more processors, without departing from the spirit and scope of the illustrative embodiments.

As shown in FIG. 4, a document 402 comprising a table structure 404 and corresponding summary 406 (or predetermined amount of text in close proximity to the table), is input to the table ingestion engine 400. The table analysis logic 410, deep semantic relationship analyzer 420, ant table insight logic 440 each operate on the table data structure 404 and corresponding summary 406 in the document 402 to perform analysis of these structures and extract information from the structures for use by the matching logic 430 and insight statement generator 450. The table analysis logic 410 analyzes the table structure 404 to extract keywords, row names, column names, and other extracted features 415 from the content of the table structure 404.

The deep semantic relationship analyzer 420 analyzes the table structure 404 and summary 406 to identify semantic relationships between entities specified in the table structure 404 and summary 406. For example, in the depicted example, a semantic relationship is identified in the table structure 404 for sales, region, and channel. Similarly, a semantic relationship is identified between amount, north, and store as well as item, location, and venue. These semantic relationships may be identified using a semantic relationship knowledge base 425 for example, based on user specified knowledge, prior relationships identified through processing of portions of text in which relationships were identified, machine learning techniques, or the like. The deep semantic relationship analyzer 420 outputs these semantic relationships found in the table structure 404 and summary 406 as semantic relationship data structures 428.

The semantic relationship data structures 428 and extracted keywords, row names, column names, and other extracted features 415 are input to the matching logic 430 along with matching knowledge bases 435. The matching knowledge bases 435 may comprise synonym data structures specifying words/phrases that are synonyms of each other, word match dictionaries, context matching rules, and the like, for providing a basis for identifying matches between the extracted features 415 from the table data structure 404 and the semantic relationships 428. In particular, the matching logic 430 performs the operations previously described above with reference to FIG. 3 with regard to matching terms and semantic relationship from the summary of the table 406 with the keywords, headers, and the like of the table data structure 404. This may include determining matches based on the determined "types" of the column/row headers and the terms/semantic relationships in the summary of the table 404, e.g., "revenue" and "currency" are of a same type, i.e. monetary terms.

The matching logic 430 further correlates the matched keywords and semantic relationships to the columns/rows of the table structure 404. That is, based on the matching keywords, the corresponding columns/rows having those keywords in the column/row header, or within the content of a cell of the column/row, are identified. Similarly, terms associated with the semantic relationships may be matched to headers and cell content in the table to identify portions of the table 404 having the associated terms. The matching logic 430 then generates results indicating the matching portions of the table data structure 404 and the keywords/semantic relationships with which those portions of the table data structure 404 are matched.

The results of the matching performed by the matching logic 430 are output to the insight statement generator 450 which generates insight statements 460 using the keywords, row/column names, semantic relationships, and the like, of the matched portions of the table data structure 404. The insight statement generator 450 further utilizes insight data structures 445 generated by the table insight logic 440 to populate insight statement templates 455 by correlating the matching portions of the table data structure 404 with the insight data structures 445 and generating one or more insight statements for the matching portions based on the insight data structures 445 corresponding to the matched portions.

The table insight logic 440 utilizes table insight analysis algorithms to identify particular insight data points in the table structure 404, e.g., a "maximum" insight algorithm, a "variance" insight algorithm, a "distribution" insight algorithm, and/or the like. The table insight logic 440 applies these algorithms to the table data structure 404 and generates insight data structures 445 which, in this example, are tuples comprising the following format (table field, insight type, row location, column location, value). It should be noted that in some cases, the location of the value for the insight type may not be actually in the table data structure 404 but may be an additional cell generated in memory based on the content of the table data structure 404, e.g., a total value for totaling all of the values of a particular column. In such a case, the location convention may treat these additional dynamically generated fields to be appended to the table data structure 404 and thus, the location values in the tuples may specify column and row locations not originally present in the table data structure 404.

The insight statement generator 450 correlates the insight statement templates 455 with the insight data structures 445 based on insight type. That is, both the insight data structures 445 and the insight statement templates 455 have associated insight types and thus, they may be matched to one another. The insight statement templates 455 matching the insight data structures 445 for the matched portions of the table 404 are then populated with corresponding information from the insight data structure 445 and the keywords, column/row headers, and semantic relationships in the matched portion result output from the matching logic 430. The resulting insight statements 460 are then output. The output of the resulting insight statements 460 may comprise annotating the original document 402 with the insight statements 460, generating metadata for the document 402 that comprises the insight statements 460, storing the insight statements as a separate data structure or file and linking the data structure/file to the document 402, or the like.

Thus, the illustrative embodiments provide mechanisms for extracting insight from table data structures in portions of content subject to natural language processing, question and answer processing, or the like. The insight may be used to generate insight statements which may be associated with the table data structure for use by natural language processing mechanisms, question and answer processing mechanisms, and the like, to perform natural language processing operations, question and answer operations, or the like, on the insight statements. As a result, information that may not otherwise be able to be automatically identified within table data structures is able to be extracted and processed using natural language processing techniques.

Figure 5A:
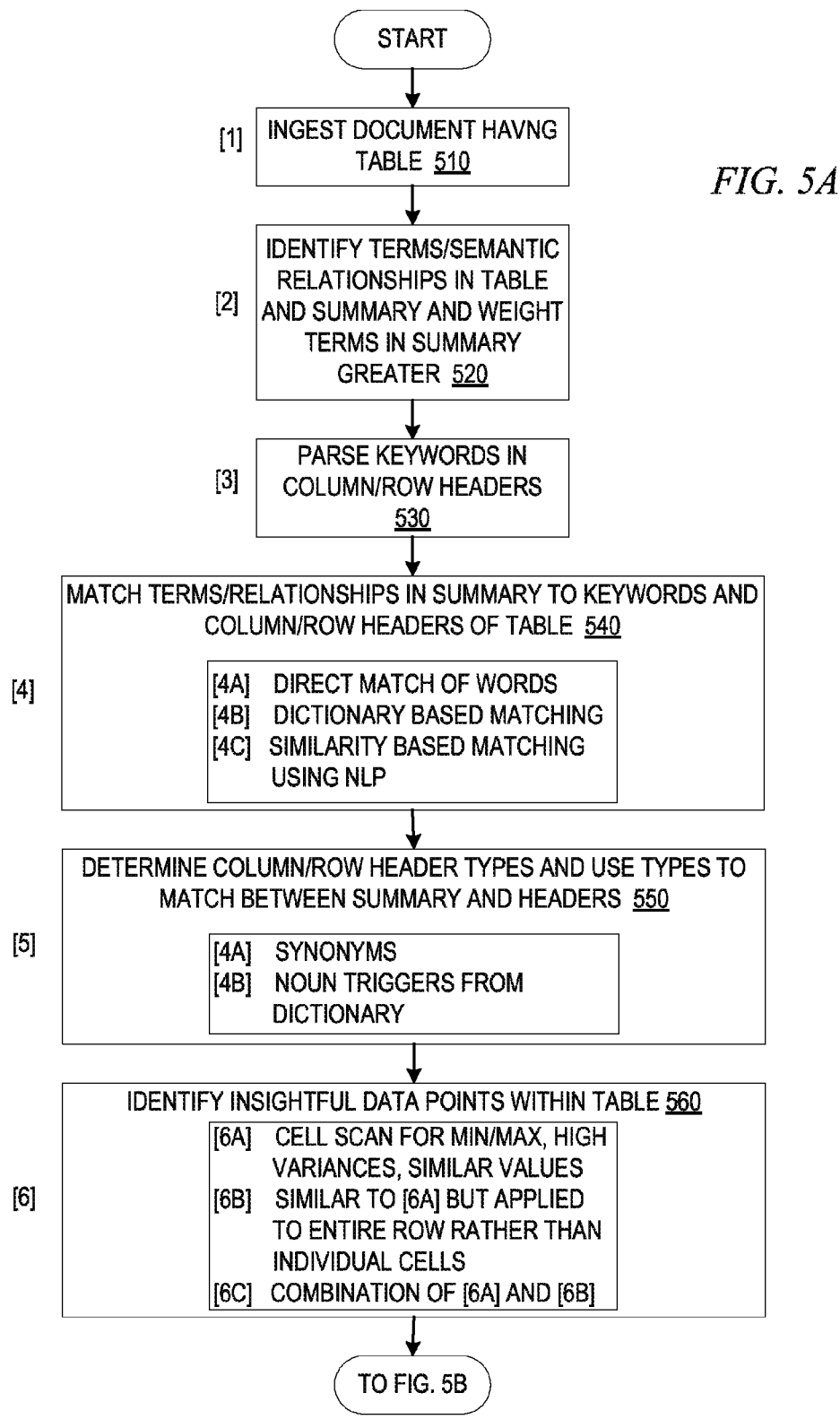
FIGS. 5A-5B illustrate a flowchart outlining an example operation of a table ingestion engine in accordance with one illustrative embodiment.
Figure 5B:
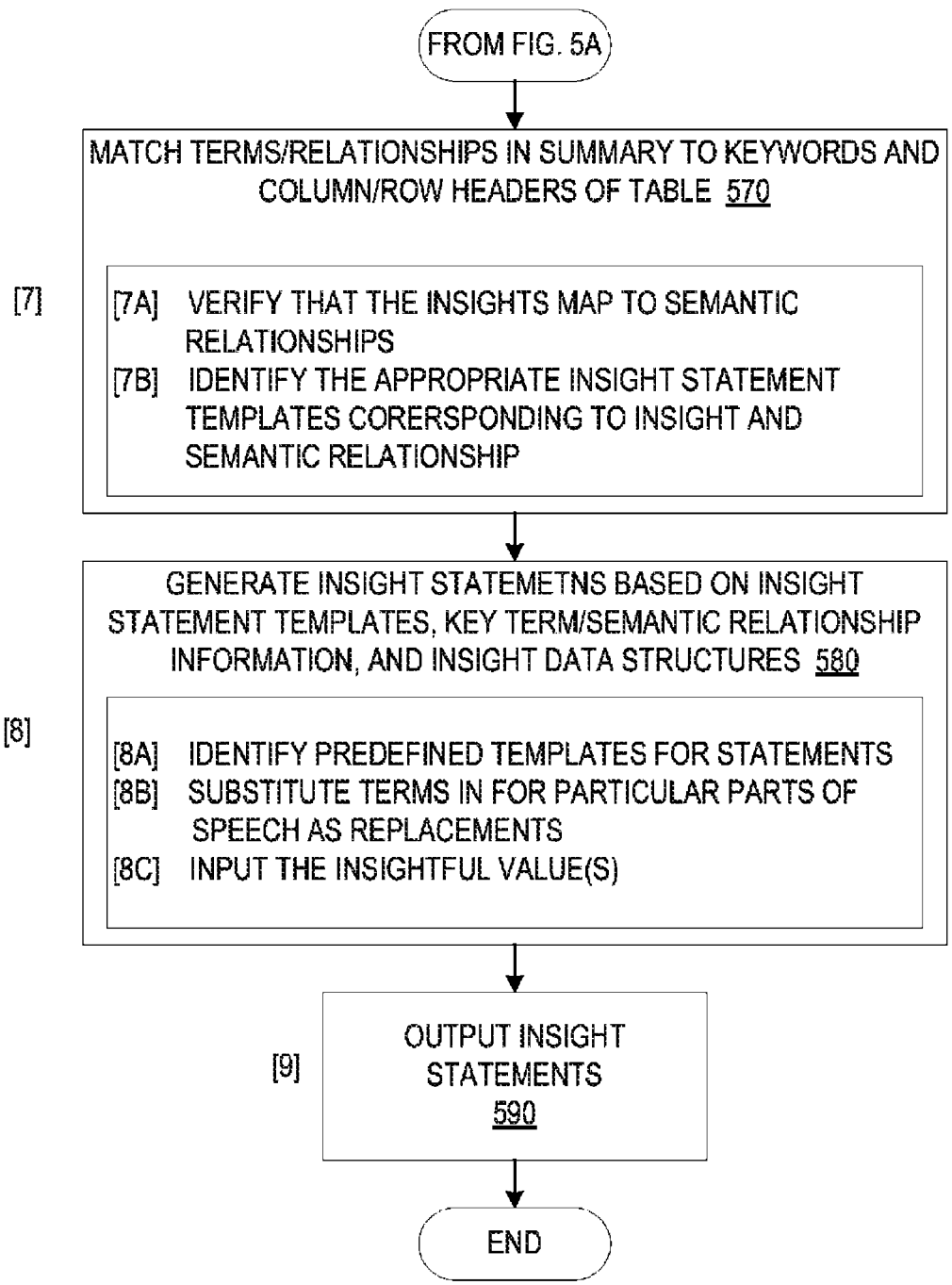

FIGS. 5A-5B illustrate a flowchart outlining an example operation of a table ingestion engine in accordance with one illustrative embodiment. It should be noted that the steps set forth in FIG. 5 are identified by step number, e.g., 510, and operation tags, e.g., "5a". The operation tag will be used hereafter in conjunction with FIG. 6 to illustrate how an example table data structure is processed to generate insight data structures, by the insight logic, for use by the insight statement generator.

As shown in FIGS. 5A-5B, the operation starts with the ingestion of a document of a corpus comprising a table data structure (step 510). Terms, semantic relationships, and the like, corresponding to the domain of the corpus are identified in the table data structure and table summary with the terms/semantic relationships found in the table summary being given greater emphasis or weight (step 520). The column/row headers of the table data structure are parsed to identify the keywords (step 530). Terms and semantic relationships from the table summary are matched to the keywords and column/row header names of the table data structure (step 540). The types of the column/row headers are determined and used to perform matching between the table summary and the column/row headers (step 550).

Insightful data points are determined within the table data structure based on a scanning of the cells of the table data structure and insight algorithms applied to the scanned cells (step 560). The column and/or rows that correspond to the insightful data points are identified (step 570) and used, along with the matched keywords and semantic relationships, to generate insight statements based on insight statement templates (step 580). The insight statements are then output for storage in association with the table data structure and/or use by an natural language processing mechanism of an NLP system, QA system, or the like (step 590).

FIG. 6 provides another example illustrating the operation of the illustrative embodiments with regard to identifying insight data points in an example table data structure. In this figure, the bracketed numbers are provided to correspond to the operation tags mentioned in FIG. 5.

In the example of FIG. 6, the table data structure 600 has an associated table summary 602 having text "The shares under option at Dec. 31, 2011 were in the following exercise price ranges." As part of operation [2], key terms, keywords, or key phrases are extracted from this table summary 602, including in this case the terms "shares under option," "exercise price", and "exercise price ranges." As part of operation [3], key terms, keywords, or key phrases are extracted from table column headers including "shares under option", "exercise price", "exercise price ranges", "intrinsic value", and "remaining contractual life."

As part of operation [4], key terms are matched between the key terms extracted from the table summary (operation [2] above) and key terms extracted from the table (operation [3] above). Certain key terms are matched exactly (operation [4a]) including "shares under option" and "exercise price." Other key terms are matched via similarity (operation [4c]), plurality in this case, such as "exercise price range" is matched to "exercise price ranges." The result of operation [4] is a set of matched terms in the summary and semantic relationships to the headers of the table data structure.

As part of operation [5] types of the column/row headers are determined using synonyms [5a], noun triggers [5b], and the like. As shown in FIG. 6, synonyms are strong indicators of column type: Number, Aggregate, Weighted Average [5a] and additional noun triggers are also indicative of column type: Price/Value is a currency type, Years is a duration type, and the like.

In operation [6], cells of the table are scanned to find the insightful data points. In this example, the cells are scanned to find the most extreme min/max values in the cells [6a]. Moreover, it is found that row 2 of the table data structure has the highest values overall [6b] and rows 1 and 2 contribute the most to the overall total shares/values [6c]. From this, various insight data structures, e.g., tuples, may be generated to identify the insight data points within the table data structure. This information is input to the insight statement generator to generate insight statements that are able to be processed more easily by natural language processing mechanisms.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating insight statements from table data, the method comprising:
　　receiving, by the data processing system, a portion of content comprising a table data structure and text associated with the table data structure;
　　identifying, by the data processing system, at least one of key terms or semantic relationships in the table data structure and the associated text;
　　identifying, by the data processing system, insight data points in the table data structure based on the identification of at least one of key terms or semantic relationships in the table data structure and the associated text, wherein the insight data points are data points in the table data structure meeting an insight condition set forth in a predefined insight data point rule;
　　generating, by the data processing system, an insight data structure specifying a field in the table data structure with which the insight data point is associated, an insight condition met by the insight data point, a location in the table data structure corresponding to the insight data point, and a value corresponding to the insight data point;

populating, by the data processing system, fields of an insight statement template with information obtained from the key terms and semantic relationships, based on the insight data structure, to generate an insight statement data structure; and outputting, by the data processing system, the insight statement data structure, wherein the insight statement data structure is a natural language statement describing an aspect of the table data structure, wherein identifying an insight data point in the table data structure comprises:

performing a matching operation that matches key terms and semantic relationships in the associated text with key terms and semantic relationships in the table data structure to identify matching portions of the table data structure, wherein the identification of the insight data point and generation of the insight data structure is performed for the matching portions of the table data structure.

2. The method of claim 1, wherein identifying key terms and semantic relationships in the table data structure and the associated text comprises:

performing natural language processing on the table data structure to identify key terms, and semantic relationships associated with key terms, in at least one of columns or rows of the table data structure; and performing natural language processing on the associated text to identify key terms and semantic relationships associated with key terms in the associated text.

3. The method of claim 1, wherein the aspect of the table data structure specified in the insight statement is an aspect of the table data not explicitly specified in the table data structure but able to be extracted from the table data through application of insight analysis logic on the table data of the table data structure.

4. The method of claim 1, wherein key terms and semantic relationships in the associated text are weighted according to a proximity of the key terms and semantic relationships to the table data structure in the content.

5. The method of claim 1, wherein the text is one of a table summary text associated with the table data structure or a predetermined amount of text in close proximity to the table data structure in the content.

6. The method of claim 1, wherein the insight statement is output to a natural language processing mechanism which processes the insight statement in association with the table data structure.

7. The method of claim 6, wherein the natural language processing mechanism is part of a question and answer system, and wherein the question and answer system performs natural language processing on the insight statement when generating candidate answers to an input question.

8. The method of claim 1, wherein the insight statement is output as one of an annotation of the table data structure, metadata associated with the content, or a separate file linked to the content.

9. The method of claim 1, wherein the insight data point rules comprise a rule for determining derived information from the information present in the table data structure, and wherein the derived information comprises at least one of a maximum value for a portion of the table data structure, a variance for values in the portion of the table data structure, a distribution of values in the portion of the table data structure, an equivalence for values in the portion of the table data structure, a difference for values in the portion of the table data structure, and a total of values in the portion of the table data structure.

10. The method of claim 1, wherein the at least one of key terms or semantic relationships in the table data structure and the associated text are key terms and semantic relationships specified in a knowledge base specifically configured for a pre-defined domain.

11. A computer program product comprising a non-transitory computer readable medium having a computer readable program stored therein, wherein the computer readable program, when executed on a computing device, causes the computing device to:

receive a portion of content comprising a table data structure and text associated with the table data structure;

identify at least one of key terms or semantic relationships in the table data structure and the associated text;

identify, by the data processing system, insight data points in the table data structure based on the identification of at least one of key terms or semantic relationships in the table data structure and the associated text, wherein the insight data points are data points in the table data structure meeting an insight condition set forth in a pre-defined insight data point rule;

generate, by the data processing system, an insight data structure specifying a field in the table data structure with which the insight data point is associated, an insight condition met by the insight data point, a location in the table data structure corresponding to the insight data point, and a value corresponding to the insight data point;

populate fields of an insight statement template with information obtained from the key terms and semantic relationships, based on the insight data structure, to generate an insight statement data structure; and output the insight statement data structure, wherein the insight statement data structure is a natural language statement describing an aspect of the table data structure, wherein the computer readable program further causes the computing device to identify an insight data point in the table data structure at least by:

performing a matching operation that matches key terms and semantic relationships in the associated text with key terms and semantic relationships in the table data structure to identify matching portions of the table data structure, wherein the identification of the insight data point and generation of the insight data structure is performed for the matching portions of the table data structure.

12. The computer program product of claim 11, wherein the computer readable program further causes the computing device to identify key terms and semantic relationships in the table data structure and the associated text at least by:

performing natural language processing on the table data structure to identify key terms, and semantic relationships associated with key terms, in at least one of columns or rows of the table data structure; and performing natural language processing on the associated text to identify key terms and semantic relationships associated with key terms in the associated text.

13. The computer program product of claim 11, wherein the aspect of the table data structure specified in the insight statement is an aspect of the table data not explicitly specified in the table data structure but able to be extracted from the table data through application of insight analysis logic on the table data of the table data structure.

14. The computer program product of claim 11, wherein key terms and semantic relationships in the associated text are weighted according to a proximity of the key terms and semantic relationships to the table data structure in the content.

15. The computer program product of claim 11, wherein the text is one of a table summary text associated with the table data structure or a predetermined amount of text in close proximity to the table data structure in the content.

16. The computer program product of claim 11, wherein the insight statement is output to a natural language processing mechanism which processes the insight statement in association with the table data structure.

17. The computer program product of claim 16, wherein the natural language processing mechanism is part of a question and answer system, and wherein the question and answer system performs natural language processing on the insight statement when generating candidate answers to an input question.

18. An apparatus comprising:
   a processor; and
   a memory coupled to the processor, wherein the memory comprises instructions which, when executed by the processor, cause the processor to:
   receive a portion of content comprising a table data structure and text associated with the table data structure;
   identify at least one of key terms or semantic relationships in the table data structure and the associated text;
   identify, by the data processing system, insight data points in the table data structure based on the identification of at least one of key terms or semantic relationships in the table data structure and the associated text, wherein the insight data points are data points in the table data structure meeting an insight condition set forth in a predefined insight data point rule;
   generate, by the data processing system, an insight data structure specifying a field in the table data structure with which the insight data point is associated, an insight condition met by the insight data point, a location in the table data structure corresponding to the insight data point, and a value corresponding to the insight data point;
   populate fields of an insight statement template with information obtained from the key terms and semantic relationships, based on the insight data structure, to generate an insight statement data structure; and
   output the insight statement data structure, wherein the insight statement data structure is a natural language statement describing an aspect of the table data structure, wherein the instructions further cause the processor to identify an insight data point in the table data structure at least by:
   performing a matching operation that matches key terms and semantic relationships in the associated text with key terms and semantic relationships in the table data structure to identify matching portions of the table data structure, wherein the identification of the insight data point and generation of the insight data structure is performed for the matching portions of the table data structure.

\* \* \* \* \*